(No Model.)

T. H. DUNHAM.
INSULATING AND PROTECTING ELECTRIC CABLES.

No. 360,567. Patented Apr. 5, 1887.

Witnesses!
Joseph Walker.
L. L. Stimpson.

Inventor.
Thomas H. Dunham.
per
Boutwell & Dunham.
his Attornies.

UNITED STATES PATENT OFFICE.

THOMAS H. DUNHAM, OF BOSTON, MASSACHUSETTS.

INSULATING AND PROTECTING ELECTRIC CABLES.

SPECIFICATION forming part of Letters Patent No. 360,567, dated April 5, 1887.

Application filed September 20, 1886. Serial No. 214,031. (No model.)

*To all whom it may concern:*

Be it known that I, THOMAS H. DUNHAM, of Boston, in the county of Suffolk and State of Massachusetts, have invented a new and useful Improvement in Electric Cables and the Insulating and Protecting the Same, of which the following, taken in connection with the accompanying drawings, is a specification.

Figure 1:
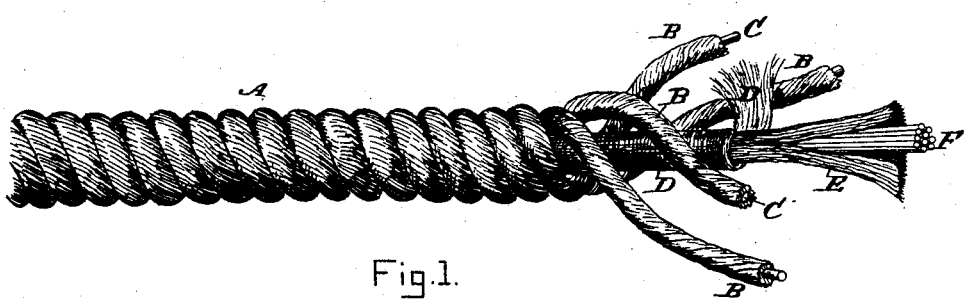
Figure 2:
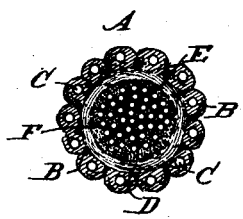

Figure 1 is a side elevation in detail of my invention. Fig. 2 is a transverse section of same.

Similar letters refer to similar parts in both figures.

In Fig. 1, for the purpose of illustration, the inner core is represented with ten wires and the outer covering with four wires. In Fig. 2, for the purpose of illustration, the inner core is represented with forty wires, the outer covering with thirteen wires.

Heretofore electric wires have been covered with lead and other metals as an outer covering, which are liable to corrosion and are very heavy, and also gutta-percha and similar substances, which do not allow of a bend or turn in any cable in an easy or ready manner, and also twisted silk and similar substances have been used; but these do not protect the wires from exposure.

The object of my invention is to insulate wire or wires with a light and flexible covering and to make a cable which is easily handled, durable, flexible, and water-proof, and which at the same time secures perfect insulation.

To carry my invention into effect, I take a sheet of untwisted raw cotton or raw silk, the one being an equivalent of the other, and form into a tube shape, E. The wire or wires F to be insulated are then placed in the tube before said tube is closed, as shown in Fig. 1, and the same is then closed around the wire or wires F and pressed thereon, as shown in Fig. 2, by the use of any suitable device. Said wire or wires F, thus covered, are then put into a strand or heart form, as shown in Fig. 2. I then cover this strand or core with an oakum, D, of cotton filled with rosin, pitch, and tar, which oakum D serves as a water-proof protection and a soft pad or cushion for the covered wire or wires F. I then take iron wires C C and cover them with cotton B, which I saturate with rosin, pitch, and tar, not necessarily but preferably in proportion one-third each. These iron wires C C, which may be one or more in the same strand when covered thus, I put on over the inner strand under solid heavy pressure by any suitable device, twisting them as strands, as shown in Fig. 1, each covered wire or wires C C having a distinct place and formed with each and all the others in regular manner, making a compact cable, A.

Having fully described my invention, and mode of carrying the same into effect, what I claim as new, and desire to secure by Letters Patent, is—

1. In an electric cable, the combination of the core composed of the wires F and of the untwisted raw cotton or silk E with an oakum, D, of untwisted raw cotton or silk saturated with a solution of rosin, pitch, and tar, substantially in the manner and for the purpose described.

2. In an electric cable, the iron wires C, covered with the untwisted raw cotton or silk B, saturated with a solution of rosin, pitch, and tar, said covered iron wires being twisted around the covered core of wires F, substantially in the manner described and shown.

3. An electric cable with each of the electric wires thereof covered with untwisted raw cotton or raw silk, the entire core of said wires being covered with said raw cotton or raw silk saturated with a solution of rosin, pitch, and tar, and the whole core covered and protected by a shield composed of one or more iron wires covered with said raw cotton or silk, saturated with said solution of rosin, pitch, and tar, and twisted around said core, substantially in the manner described, and for the purpose set forth.

In testimony whereof I have signed my name to this specification, in the presence of two subscribing witnesses, on this 16th day of September, A. D. 1886.

THOMAS H. DUNHAM.

Witnesses:
H. DUNHAM,
F. DUNHAM.